United States Patent
Haasch et al.

[11] Patent Number: 5,806,581
[45] Date of Patent: Sep. 15, 1998

[54] OIL COOLER WITH A RETAINED, BLOW-OUT PROOF, AND EXTRUSION RESISTANT GASKET CONFIGURATION

[75] Inventors: James T. Haasch, Bay View; James J. Cavalluzzi, Big Bend, both of Wis.

[73] Assignee: Modine Manufacturing Company, Racine, Wis.

[21] Appl. No.: 576,787

[22] Filed: Dec. 21, 1995

[51] Int. Cl.$^6$ .................................. F28F 7/00; F16J 15/12
[52] U.S. Cl. ............................. 165/76; 165/916; 277/183
[58] Field of Search ................................. 165/41, 916, 76; 277/181–184, 189

[56] References Cited

U.S. PATENT DOCUMENTS

| | | | |
|---|---|---|---|
| 2,199,647 | 5/1940 | Mueller et al. | 277/189 X |
| 3,575,429 | 4/1971 | Spofford | 277/166 |
| 5,203,832 | 4/1993 | Beatenbough et al. | 165/41 |
| 5,226,476 | 7/1993 | Martin | 165/157 |
| 5,301,958 | 4/1994 | Covington | 277/183 |

FOREIGN PATENT DOCUMENTS

| | | | |
|---|---|---|---|
| 242685 | 5/1946 | Switzerland | 277/182 |

*Primary Examiner*—Allen J. Flanigan
*Attorney, Agent, or Firm*—Wood, Phillips, VanSanten, Clark & Mortimer

[57] ABSTRACT

In an oil cooling system including an oil cooler housing (26) adapted to be face-sealed against a mating surface (46) including a port (47) connected to the high pressure side of a pressurized oil circulating system. The oil cooling system includes a base wall (60) on the housing (26) in a parallel relation to the mating surface (46), and an annular flange (52) extending from the base wall (60) and defining a radially-opening annular groove (54) that faces the port (47). An annular gasket (44) is located in the groove (54) between the flange (52) and the port (47) and has a flange-facing surface (68) that is complementary with the flange (52) on the side thereof defining the groove (54). The annular gasket (44), on the side thereof opposite the flange-facing surface (68), has a pressure-responsive surface (70) facing the port (47) so that, when the system is operating, oil under pressure from the port (47) will act against the pressure-responsive surface (70) to urge the gasket (44) into the groove (54) against the flange (52).

19 Claims, 2 Drawing Sheets

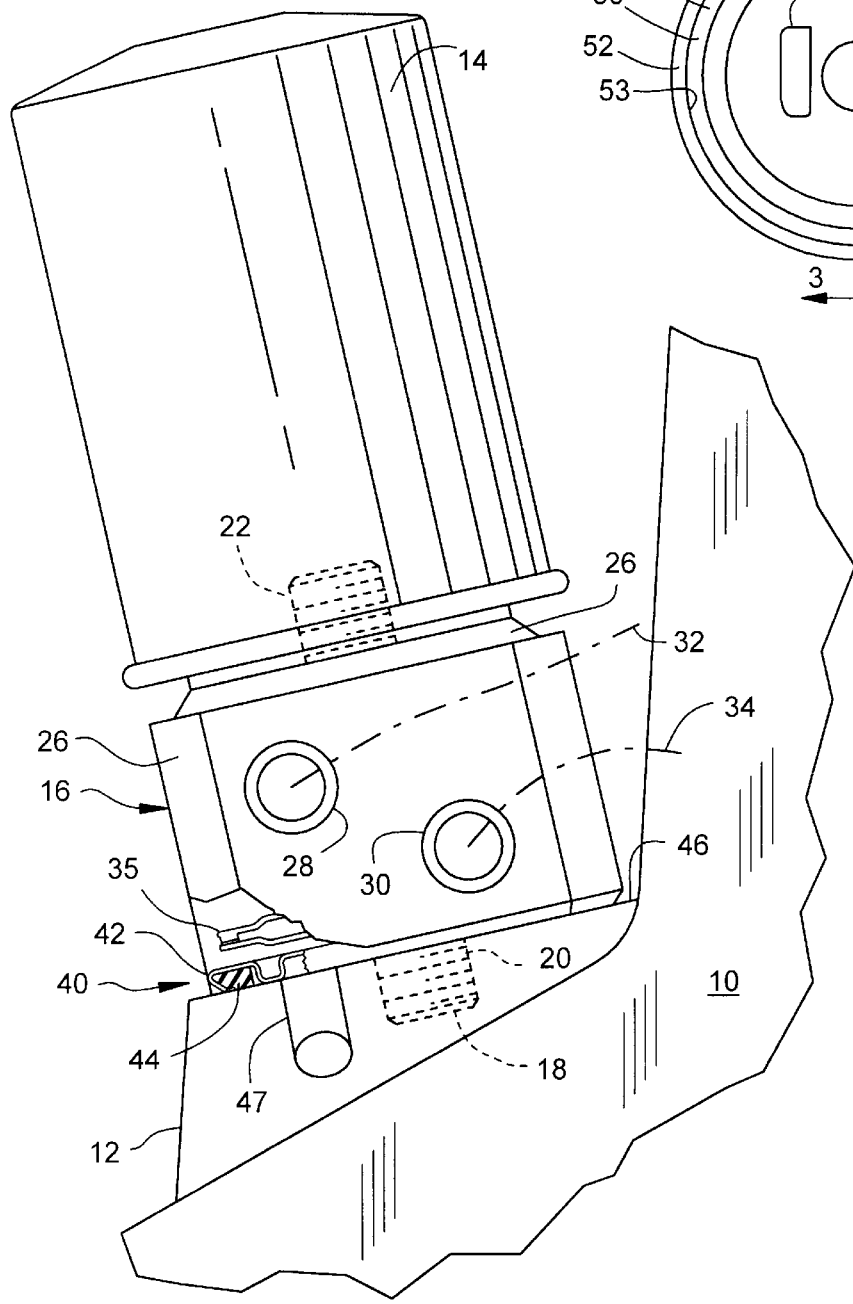
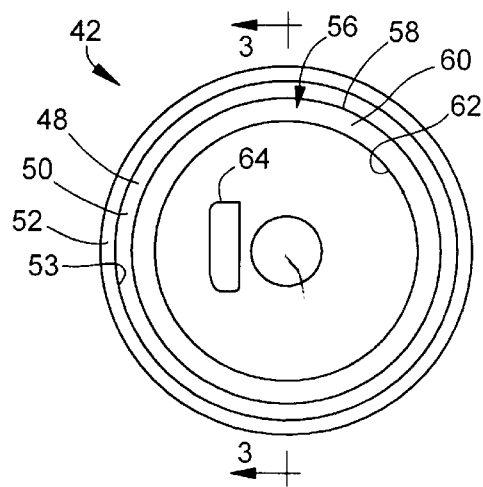

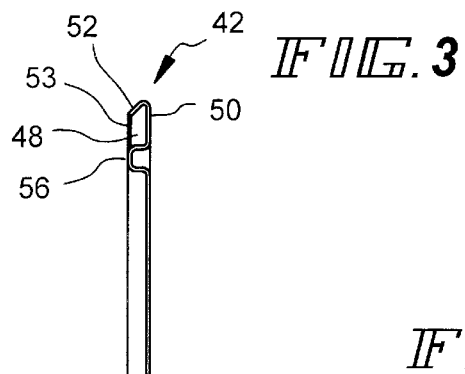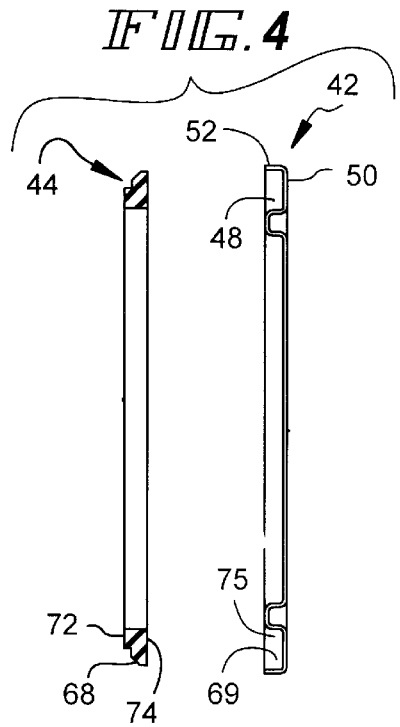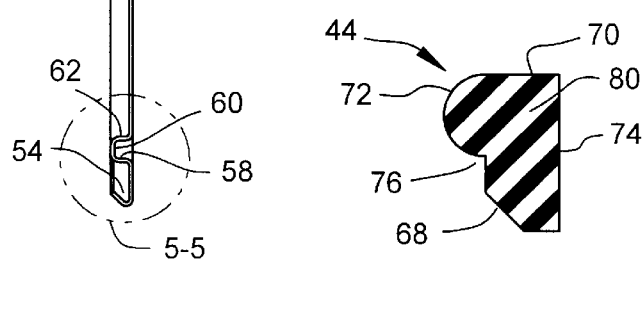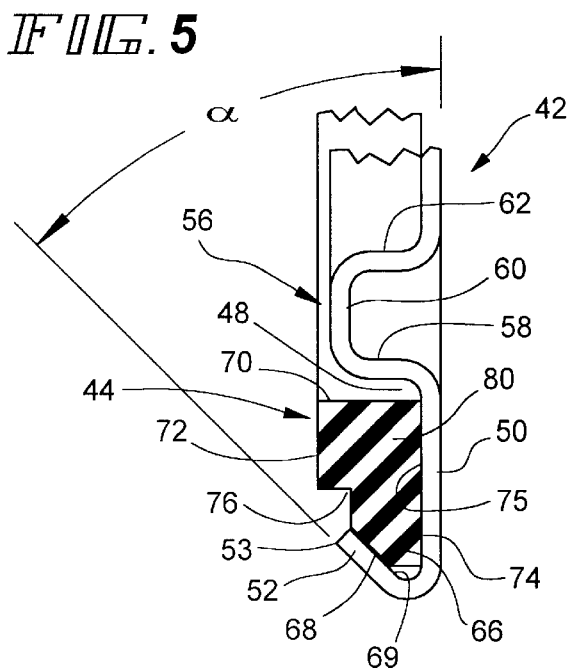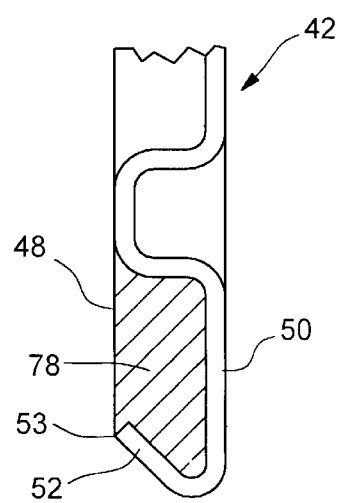

OIL COOLER WITH A RETAINED, BLOW-OUT PROOF, AND EXTRUSION RESISTANT GASKET CONFIGURATION

FIELD OF THE INVENTION

This invention generally relates to the art of heat exchangers and, more particularly, to heat exchangers used as oil coolers in vehicular applications.

BACKGROUND OF THE INVENTION

The use of heat exchangers to cool lubricating oil employed in the lubrication systems of internal combustion engines has long been known. One form of such heat exchanger currently in use is a so-called "donut" oil cooler. These oil coolers have an axial length of only a couple of inches or less and are constructed so that they may be interposed between the engine block and the oil filter, being attached directly to the block in a location formerly occupied by the oil filter. Typically, oil coolers of this type include a multi-piece housing which is connected to the vehicular cooling system to receive coolant, and which contains a stack of relatively thin, disc-like chambers through which the oil to be cooled is circulated. Examples of such oil coolers are disclosed in U.S. Pat. Nos. 4,967,835; 4,561,494; 4,360,055; and 3,743,011, the details of which are incorporated by reference.

It is common for the lower end of the heat exchanger to be defined by a stamped, sheet metal gasket plate that is shaped to provide an annular channel or cavity for receiving an annular gasket which serves as a face seal between the oil cooler and the engine block.

While this gasket configuration has proven to be quite successful at performing the required sealing function, there are certain ancillary functions that can be improved.

For example, it is often desirable to ship the oil coolers with the annular gasket installed in the cavity. However, there is a tendency for the gasket to slip from the cavity during shipment and prior to installation of the oil cooler.

One common approach to this problem involves forming the cavity so that the side walls of the cavity abut the inside and outside circumferential surfaces of the gasket, thereby retaining the gasket with the frictional forces between the surfaces. While this solution somewhat decreases the likelihood that the gasket will slip from the cavity, it does not provide absolute retention and it may not decrease gasket slippage to a desirable level. Additionally, because of the tight fit of the gasket in the cavity, this configuration does not comply with the guidelines established and published in the Society of Automotive Engineers (SAE) handbooks. Both SAE handbooks and vendor literature call out a gasket cross-sectional area to groove cross-sectional area ratio of approximately 80%. The greater cross-sectional area of the gasket cavity provides room for the gasket to expand into when compressed, thereby avoiding gasket deterioration due to overstressing of the gasket material. Additionally, this greater cross-sectional area provides room for the gasket to swell into when the gasket becomes saturated with oil.

It is also known to provide a thin tab or other protrusion on the inner diameter of a gasket having a standard "O-ring" configuration and to retain the tab or other protrusion with a continuous or noncontinuous crimped flange that captures the tab or other protrusion. The outer diameter surface of the "O-ring" gasket is retained by a vertical wall. While this solution appears to decrease the likelihood that the gasket will slip from the cavity, it does not address concerns about pressure-induced extrusion of the gasket.

More specifically, pressure-induced extrusion is another ancillary concern that arises when the oil cooler is used in conjunction with a high pressure lubrication system. In some conventional gasket plate configurations, the outer rim of the gasket plate defines the outer periphery of the gasket cavity, but has little, if any, reinforcement and, therefore, may be susceptible to pressure-induced deformations due to the high pressure at which a typical lubrication system operates. These deformations allow the gasket to shift, thereby increasing the possibility of leakage. Additionally, the deformations may allow the gasket to extrude through any gaps created by deformation, thereby lessening the compressive forces on the remainder of the gasket and further increasing the possibility of leakage.

It is also common for such conventional gasket plates to be provided with a dome-shaped seating bead adjacent the gasket cavity on the radially-inward side of the gasket cavity. When the oil cooler is in the installed position, the seating bead abuts the engine block thereby limiting the compression of the gasket between the oil cooler and the engine block to appropriate values. Typically, the outer rim of the gasket cavity is formed at a lower height then the seating bead height to prevent the oil cooler from seating on the edge of the outer rim, rather than on the seating bead. However, this creates a problem in that the gasket, when under system pressure, may gradually extrude into the gap that is inherently created between the edge of the outer rim and the engine block, thereby lessening the compressive forces on the remainder of the gasket and increasing the possibility of oil leakage.

Some conventional gasket plates incorporate a seating bead at the outer rim of the gasket cavity. However, extrusion may occur with this design due to gaps that are created by variations in the finished dimensions of the components due to manufacturing tolerances.

Thus, it can be seen that there is a need for a new, reliable gasket configuration that can be incorporated in an oil cooler and provide reliable retention of the gasket during shipment and prior to installation. It can also be seen that there is need for such a gasket configuration that further provides a gasket cavity cross-sectional area to gasket cross-sectional area ratio that complies with SAE and vendor guide lines. It further can be seen that there is a need for a gasket configuration that is not susceptible to leakage resulting from deformations induced from high pressure in a lubrication system. Finally, it can be seen that there is a need for a gasket configuration that provides a seating bead to limit the compression of the gasket to appropriate values, while also providing an outer rim configuration that prevents extrusion of the gasket under pressure.

SUMMARY OF THE INVENTION

It is the principal object of the invention to provide a new and improved gasket configuration or sealing system. More specifically, it is an object of the invention to provide a reliable gasket configuration or sealing system that can be used in conjunction with an oil cooler, preferably a donut oil cooler, to provide reliable retention of a gasket during shipment of the oil cooler and/or to provide increased pressure resistance and/or to prevent pressure-induced extrusion of the gasket.

An exemplary embodiment of the invention achieves the foregoing objects in an oil cooler including a housing having a gasket configuration adapted to be face-sealed against a mating surface associated with an oil system. The gasket configuration includes a base wall extending substantially parallel to the mating surface, a reentrant flange extending from the base wall, a gasket cavity defined by the base wall and the reentrant flange, the reentrant flange defining an outermost periphery of the gasket cavity, and a gasket received in the gasket cavity and having a cross section shaped to conform at least partially to the reentrant flange.

According to one facet of the invention, the reentrant flange is annular.

According to another facet of the invention, the reentrant flange and the base wall are unitary.

According to yet another facet of the invention, the gasket configuration further includes a second flange spaced from the reentrant flange and extending from the base wall, with the gasket cavity being further defined by the second flange. The base wall, the reentrant flange, and the second flange are relatively spaced to retain the gasket within the gasket cavity during shipment and prior to installation of the oil cooler.

According to one facet of the invention, the reentrant flange and the second flange combine to define a cross-sectional area for the gasket cavity that is greater in magnitude than the area defined by the gasket cross section.

One embodiment of the invention achieves the foregoing objects in an oil cooler including a housing having a gasket configuration adapted to be face-sealed against a mating surface associated with an oil system. The gasket configuration includes a base wall extending substantially parallel to the mating surface; a pressure-responsive, reentrant flange extending from the base wall and adapted to increasingly engage the mating surface in response to pressure increases from the oil system; a gasket cavity defined by the base wall and the reentrant flange; and a gasket received in the gasket cavity.

According to one facet of the invention, the reentrant flange extends at an acute angle relative to the base wall to form a wedge-shaped cross section therebetween, and the gasket has a substantially wedge-shaped cross section extending between the reentrant flange and the base wall and an opposite, pressure-responsive surface adapted to be exposed to oil under pressure.

In one embodiment of the invention, a pressure-energized sealing system for face-sealing an oil cooler to a mating surface associated with an oil system is provided. The sealing system includes a base wall, a reentrant flange extending from the base wall, a gasket cavity defined by the base wall and the reentrant flange, a gasket received in the gasket cavity, and means for preventing pressure-induced extrusion of the gasket when the system is energized by pressure from the oil system. The preventing means includes a terminal edge on the reentrant flange and pressure-responsive cooperating surfaces between the gasket and the base wall and between the gasket and the reentrant flange. The pressure-responsive surfaces are adapted to forcibly engage the terminal edge with the mating surface in response to pressure from the oil system.

According to one facet of the invention, the gasket has a notch adjacent the terminal edge to prevent cutting of the gasket by the edge.

According to another facet of the invention, the cooperating surfaces define substantially wedge-shaped cross sections for the gasket and the gasket cavity.

According to still another facet of the invention, the base wall extends substantially parallel to the mating surface, and the edge is substantially parallel to the base wall. The reentrant flange, the edge and the gasket all are annular.

One exemplary embodiment of the invention achieves the foregoing objects in an oil cooler including a housing having a gasket configuration adapted to be face-sealed against a mating surface associated with an oil system. The gasket configuration includes a gasket, and a gasket plate formed from sheet stock. The gasket plate has a base wall and a reentrant flange defining a gasket cavity receiving the gasket. The reentrant flange defines an outermost periphery of the gasket cavity and at least part of the reentrant flange extends over at least part of the gasket to at least partially trap the gasket in the cavity.

According to one facet of the invention, the reentrant flange is crimped to extend the part of the reentrant flange over the part of the gasket.

According to another facet of the invention, the reentrant flange is an annular rim that defines the outermost periphery of the gasket plate.

One exemplary embodiment of the invention achieves the foregoing objects in an oil-cooling system including an oil cooler housing adapted to be face-sealed against a mating surface including a port connected to the high pressure side of a pressurized oil circulating system. The oil-cooling system includes a base wall on the housing in parallel relation to the mating surface, an annular flange extending from the base wall and defining a radially-opening annular groove that faces the port. An annular gasket is located in the groove between the flange and the port and has a flange-facing surface that is complementary with the flange on the side thereof defining the groove. The annular gasket, on the side thereof opposite the flange-facing surface, has a pressure-responsive surface facing the port so that, when the system is operating, oil under pressure from the port will act against the pressure-responsive surface to urge the gasket into the groove against the flange.

According to one facet of the invention, the radially-opening annular groove has a substantially wedge-shaped cross section.

According to another facet of the invention, the base wall and the flange are unitary.

According to yet another facet of the invention, the radially-opening annular groove opens radially inward.

Other objects and advantages will become apparent from the following specification taken in connection with the accompanying drawings.

BRIEF DESCRIPTION OF THE DRAWINGS

FIG. 1 is a side elevational view, partially in section, of an engine block having mounted thereon an oil cooler employing a gasket configuration embodying the invention, with a filter of the customary type in position superimposed on the oil cooler;

FIG. 2 is a plan view of a gasket plate employed in the invention, with the gasket removed;

FIG. 3 is a sectional view of the gasket plate, taken approximately along the line 3—3 in FIG. 2;

FIG. 4 is a view of the gasket plate in an intermediate state of construction and with a gasket shown in section, spaced from the gasket plate;

FIG. 5 is a fragmentary enlarged view of the encircled portion 5—5 of the gasket plate shown in FIG. 3, with a gasket installed in the gasket plate;

FIG. 6 is a view of the portion of the gasket plate shown in FIG. 5 with the gasket removed and with the cross-sectional area of the gasket cavity shown with hatching; and FIG. 7 is a cross section showing another embodiment of the gasket shown in FIGS. 4 and 5.

DETAILED DESCRIPTION OF THE PREFERRED EMBODIMENT

An exemplary embodiment of a heat exchanger made according to the invention is described herein and is illustrated in the drawings in connection with an oil-cooling function for the lubricating oil of an internal combustion engine. However, it should be understood that the invention may find utility in other applications, and that no limitation to use as an oil cooler is intended except insofar as expressly stated in the appended claims.

With reference to FIG. 1, the block of an internal combustion engine is fragmentarily shown at 10 and includes a seat 12 which is normally adapted to receive an oil filter 14. In the case of the invention, however, a donut oil cooler, generally designated 16, is interposed between the oil filter 14 and the seat 12. More particularly, the oil cooler 16 is held in sandwiched relation between the filter 14 and the seat 12 by an adapter/oil transfer tube, generally designated 18 of conventional construction. The transfer tube 18 has one threaded end 20 that is inserted in the oil return port in the seat 12 and an opposite threaded end 22 which is threaded into the central opening of the filter 14.

A housing 26 of the oil cooler 16 includes spaced inlet and outlet nipples 28 and 30, respectively, which may be connected by hoses, shown schematically at 32 and 34, into the coolant system for the internal combustion engine. The housing encloses a plurality of heat exchange units 35 that may be of any configuration commonly employed in the field of donut oil coolers, one example of which is described in detail in U.S. Pat. No. 4,561,494 to Frost, issued Dec. 31, 1985, the details of which are herein incorporated by reference.

The gasket configuration or pressure-energized sealing system embodying the present invention is shown generally at 40 and includes a gasket plate 42 and an annular gasket 44 located at the interface of the oil cooler 16 and the engine block 10. The gasket plate 42 typically forms one side of the housing 26 of the oil cooler 16. The gasket 44 is compressed between the gasket plate 42 and a mating surface 46 of the seat 12 and operates to seal the oil-cooling system of the internal combustion engine and specifically to seal oil from an oil supply port 47 connected to the high pressure side of a pressurized oil circulating system of the oil-cooling system.

As seen in FIGS. 2 and 3, the gasket plate 42 has a gasket cavity 48 defined in part by a base wall 50 and an annular reentrant flange 52 having an annular, terminal edge 53. The gasket cavity includes a wedge-shaped, radially-opening annular groove 54 that is defined by the reentrant flange 52 and a portion of the base wall 50. An annular seating bead 56 is located on the opposite side of the gasket cavity 48 from the annular groove 54. The seating bead 56 is defined by an annular second flange 58 extending from and perpendicular to the base wall 50, an annular seating wall 60 extending from the second flange 58 and parallel to the base wall 50, and a third annular flange 62 extending from and perpendicular to the seating wall 60. The gasket plate 42 also includes a port 64 that is connected to the high pressure side of the pressurized oil-circulating system of the internal combustion engine by the port 47.

As best seen in FIG. 5, the gasket 44 is received in the gasket cavity 48 and has a cross section shaped to conform at least partially to the reentrant flange 52 and to the gasket cavity 48. More specifically, the reentrant flange 52 extends at an acute angle a relative to the base wall 50 to form a wedge-shaped cross section therebetween and the gasket 44 has a substantially wedge-shaped cross section 66 extending between the reentrant flange 52 and the base wall 50. The reentrant flange 52, the base wall 50 and the second flange 58 are relatively spaced so that the gasket 44 is retained within the gasket cavity 48 during shipment and prior to installation of the oil cooler 16. This is so, even when the gasket 44 shifts so that it is abutted against the second flange 58.

The gasket 44 includes an annular flange-facing surface 68 that partially defines the wedge-shaped cross section 66 and faces a gasket-facing surface 69 of the flange 52. The gasket 44 further includes an annular pressure-responsive surface 70 on the opposite side of the gasket 44 from the wedge-shaped cross section 66 and the flange-facing surface 68. The gasket 44 is also provided with annular sealing surfaces 72 and 74 that mate with, and seal against, the mating surface 46 of the seat 12 and a sealing surface 75 of the base wall 50, respectively, when the oil cooler 16 is in the installed position. As best seen in FIG. 7, the annular sealing surface 72 may be provided in a rounded configuration, rather than the relatively flat configuration shown in FIGS. 4 and 5. Finally, the gasket 44 is provided with an annular notch or step 76 adjacent the terminal edge 53 and the flange-facing surface 68 to space the gasket 44 from the terminal edge 53. This prevents cutting of the gasket 44 by the terminal edge 53.

Turning now to both FIG. 5 and FIG. 6, it can be seen that the gasket cavity 48 has a total cross-sectional area 78 (shown hatched) and the gasket 44 has a total cross-sectional area 80 (shown hatched). The cross-sectional areas 78 and 80 are sized to comply with SAE handbook and vender literature standards, and to have a ratio of gasket cross-sectional area 80 to groove cross-sectional area 78 of approximately 80%. By making the cross-sectional area 78 larger than the cross-sectional area 80, the gasket 44 has room to expand when compressed in the installed position, thereby avoiding deterioration of the gasket 44 due to over stressing of the gasket material. A larger groove cross-sectional area 78 also provides room for the gasket 44 to swell as the gasket 44 becomes saturated with oil.

As seen in FIG. 4, prior to the gasket 44 being installed in the gasket cavity 48, the reentrant flange 52 extends perpendicular from the base wall 50. In the preferred embodiment, the gasket 44 is placed in the gasket cavity 48 after the oil cooler 16 has been brazed. The flange 52 is then crimped radially inward and over the flange-facing surface 68 of the gasket to form the gasket configuration 40 of the present invention. Alternatively, the flange 52 can be crimped radially inward prior to the brazing of the oil cooler 16. The gasket 44 would be sized so that its compliant material properties allow it to be inserted into the gasket cavity 48 with the reentrant flange 52 pre-crimped.

It will be appreciated that the use of a gasket plate 42 and the above-recited crimping procedures is but one way of forming the gasket configuration 40 of the present invention. It is anticipated that the gasket configuration can be achieved in ways other than as illustrated with the preferred embodiment. For example, the gasket cavity 48 and the reentrant flange 52 could be formed in a piece of bar stock using some form of dovetail cutter, and the gasket 44 would then be inserted into the pre-formed gasket cavity 48.

In operation, the gasket 44 is compressed between the gasket plate 42 and the mating surface 46 so that sealing surfaces 72 and 74 mate with and seal against the mating surface 46 and the base wall 50, respectively. When the oil-cooling system of the engine becomes operational, oil from the high pressure side of the oil-circulating system flows through the port 47 and acts upon the pressure-responsive surface 70 to urge the gasket 44 into the annular groove 54 against the reentrant flange 52. In response to the oil pressure, the wedge-shaped cross section 66 and the surfaces 68 and 74 associated therewith are forced into the wedge-shaped cross section formed by the surface 69 of the reentrant flange 52 and the surface 75 of the base wall 50, thereby forcibly engaging the terminal edge 53 with the mating surface 46. By forcing the terminal edge 53 against the mating surface 46, gaps are eliminated between the gasket plate 42 and the mating surface 46, thereby preventing pressure-induced extrusion of the gasket 44. Accordingly the reentrant flange 52 is pressure-responsive and adapted to increasingly engage the mating surface 46 in response to pressure increases from the oil system.

It will also be appreciated that the reentrant flange 52 is particularly well adapted for resisting leakage due to pressure-induced deformations. Compared to a conventional design, the inward chamfer design requires significantly larger deformations before the probability of leakage is increased. Moreover, the mating surface 46 reinforces the reentrant flange 52 when the terminal edge 53 is forced against the mating surface 46 under pressure, thereby providing increased pressure resistance.

Thus, a pressure and extrusion-resistant gasket configuration 40 that positively retains a gasket 44 during shipment and prior to installation is provided for use in conjunction with a donut oil cooler 16.

We claim:

1. In an oil cooler including a housing having a gasket configuration adapted to be face sealed against a mating surface associated with an oil system, the improvement wherein said gasket configuration comprises:

a base wall extending substantially parallel to the mating surface;

a reentrant flange extending from the base wall;

a gasket cavity defined by the base wall and the reentrant flange, the reentrant flange defining an outermost periphery of the gasket cavity; and a gasket received in the gasket cavity and having a cross-section shaped to conform at least partially to the reentrant flange.

2. The improvement of claim 1 wherein the reentrant flange extends at an acute angle relative to the base wall.

3. The improvement of claim 1 wherein the reentrant flange is annular.

4. The improvement of claim 1 wherein the reentrant flange and the base wall are unitary.

5. The improvement of claim 1 further comprising:

a second flange spaced from the reentrant flange and extending from the base wall, the second flange further defining the gasket cavity; and the base wall, the reentrant flange, and the second flange being relatively spaced to retain the gasket within the gasket cavity during shipment and prior to installation of the oil cooler.

6. The improvement of claim 5 wherein the base wall, the reentrant flange, and the second flange combine to define a cross-sectional area for the gasket cavity that is greater in magnitude than the area defined by the gasket cross-section.

7. In an oil cooler including a housing having a gasket configuration adapted to be face sealed against a mating surface associated with an oil system, the improvement wherein said gasket configuration comprises:

a base wall extending substantially parallel to the mating surface;

a pressure responsive, reentrant flange extending from the base wall, adapted to increasingly engage the mating surface in response to pressure increases from the oil system;

a gasket cavity defined by the base wall and the reentrant flange; and a gasket received in the gasket cavity.

8. The improvement of claim 7 wherein:

the reentrant flange extends at an acute angle relative to the base wall to form a wedge shaped cross-section therebetween; and the gasket has a substantially wedge shaped cross-section extending between the reentrant flange and the base wall and an opposite, pressure responsive surface adapted to be exposed to oil under pressure.

9. A pressure energized sealing system for face sealing an oil cooler to a mating surface associated with an oil system, said sealing system comprising:

a base wall;

a reentrant flange extending from the base wall;

a gasket cavity defined by the base wall and the reentrant flange;

a gasket received in the gasket cavity; and means for preventing pressure induced extrusion of the gasket when the system is energized by pressure from the oil system, said means comprising a terminal edge on the reentrant flange and pressure responsive cooperating surfaces between the gasket and the base wall and between the gasket and the reentrant flange, the surfaces adapted to forcibly engage the terminal edge with the mating surface in response to pressure from the oil system.

10. The sealing system of claim 9 wherein the gasket has a notch adjacent the terminal edge to prevent cutting of the gasket by the edge.

11. The sealing system of claim 9 wherein the cooperating surfaces define substantially wedge shaped cross-sections for the gasket and the gasket cavity.

12. The sealing system of claim 9 wherein:

the base wall extends substantially parallel to the mating surface;

the edge is substantially parallel to the base wall; and the reentrant flange, the edge, and the gasket are annular.

13. In an oil cooler including a housing having a gasket configuration adapted to be face sealed against a mating surface associated with an oil system, the improvement wherein said gasket configuration comprises:

a gasket;

a unitary gasket plate formed from sheet stock, the gasket plate having a base wall and a reentrant flange defining a gasket cavity receiving the gasket, the reentrant flange defining an outermost periphery of the gasket cavity, at least part of the reentrant flange extending over at least part of the gasket to at least partially trap the gasket in the cavity.

14. The improvement of claim 13 wherein the reentrant flange is crimped to extend the part of the reentrant flange over the part of the gasket.

15. The improvement of claim 13 wherein the reentrant flange is an annular rim that defines the outermost periphery of the gasket plate.

16. In an oil cooling system including an oil cooler housing adapted to be face sealed against a mating surface including a port connected to the high pressure side of a pressurized oil circulating system, the improvement which comprises:

a base wall on said housing in parallel relation to said mating surface;

an annular flange extending from said base wall and defining a radially opening annular groove, said annular groove further facing said port; and an annular gasket located in said groove between said flange and said port and having a flange facing surface that is complementary with said flange on the side thereof defining said groove, said annular gasket, on the side thereof opposite said flange facing surface, having a pressure responsive surface facing said port so that, when said system is operating, oil under pressure from said port will act against said pressure responsive surface to urge said gasket into said groove against said flange.

17. The improvement of claim 16 wherein the radially opening annular groove has a substantially wedge shaped cross-section.

18. The improvement of claim 16 wherein the base wall and the flange are unitary.

19. The improvement of claim 16 wherein the radially opening annular groove opens radially inward.

* * * * *